April 23, 1963     R. D. BOURGERIE     3,087,093
CAPACITOR PROTECTION
Filed May 13, 1959
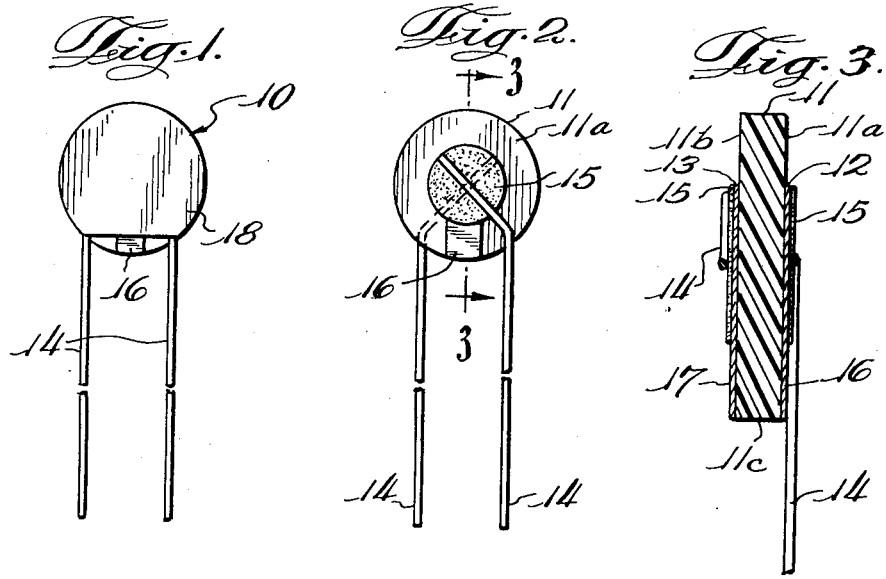
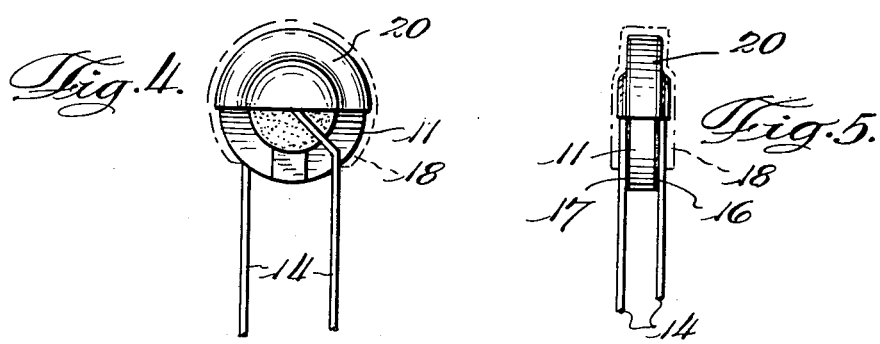
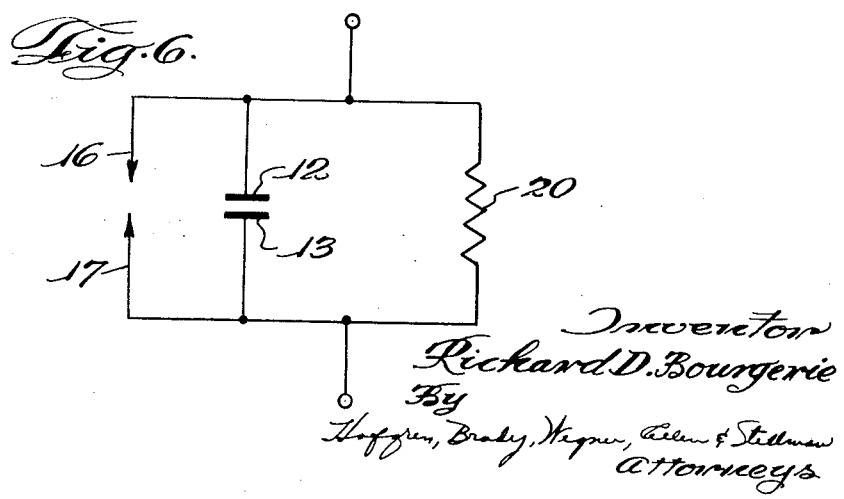
Inventor
Richard D. Bourgerie
By
Hofgren, Brady, Wegner, Allen & Stellman
Attorneys

United States Patent Office 3,087,093
Patented Apr. 23, 1963

3,087,093
CAPACITOR PROTECTION
Richard D. Bourgerie, Lincolnwood, Ill., assignor to P. R. Mallory & Co., Inc., a corporation of Delaware
Filed May 13, 1959, Ser. No. 812,920
3 Claims. (Cl. 317—12)

This invention relates to a capacitor and more particularly to a ceramic capacitor designed for dissipating high voltages in a safe manner.

Capacitors are sometimes used in a situation where they are exposed to the likelihood of being subjected to extremely high voltages, as from lightning. For example, in a radio or television receiver a capacitor is connected in the antenna circuit and, in many cases, in the incoming power line. If lightning strikes the antenna or the power system the capacitor may fail and a dangerous potential be applied to portions of the chassis which are otherwise safe and other elements of the circuit may be damaged.

A principal object of the present invention is the provision of a novel capacitor which dissipates excessive voltages without damage to the capacitor.

More particularly, one feature of the invention is the provision of a capacitor comprising a body of dielectric material, conductive capacitor terminal areas on spaced surfaces of the body and spaced conductive surfaces on the body connected with the capacitor and terminal areas and providing a spark gap. Another feature is that the body and terminal areas are covered with a coating of insulating material, with the spark gap surfaces free of the coating.

A further feature is that the body of dielectric material is disc-shaped having generally parallel spaced faces on which the conductive capacitor and terminal areas are formed, and the conductive spark gap areas terminate along edges of the disc.

Still another feature is the provision of such a capacitor with a resistive coating connecting the conductive capacitor and terminal areas for dissipating a slowly accumulating charge before it has an opportunity to build up to an unsafe potential. And a further feature is that the resistive coating on a capacitor provided with spark gap surfaces is spaced from such surfaces.

Further features and advantages of the invention will readily be apparent from the following specification and from the drawings, in which:

FIGURE 1 is an elevational view of a capacitor embodying the invention;

FIGURE 2 is a view of the capacitor of FIGURE 1 with the insulating coating removed;

FIGURE 3 is an enlarged section taken generally along lines 3—3 of FIGURE 2;

FIGURE 4 is a view similar to FIGURE 2 of a modified form of the invention;

FIGURE 5 is an end view of FIGURE 4; and

FIGURE 6 is a schematic representation of the circuit of the capacitor of FIGURE 4.

The problem of the failure of certain capacitors in home appliances such as radios and television receivers stems from the fact that capacitors are often connected from the antenna or power circuits to the chassis which serves as a ground or common return. A surge of high voltage, as from lightning, is most likely to occur in the antenna or power circuits of the device and if such a voltage surge shorts the capacitor, line voltage may be applied to the chassis or to the antenna circuit. This problem is particularly dangerous where the device has a metal cabinet, often used in portable television receivers, as a dangerous potential may be applied to the cabinet itself. The novel capacitor disclosed and claimed herein dissipates excessive voltages either of a surge nature as from lightning or resulting from a slow build-up of charge, without damage to the capacitor or danger to the user of the device.

Turning now to FIGURES 1–3 of the drawing, a capacitor 10 is shown comprising a generally circular disc 11 of a suitable ceramic dielectric material. Conductive capacitor and terminal areas 12 and 13 are formed on opposite generally parallel faces 11a and 11b of the disc and are preferably a conductive silver material or the like. Terminals 14 are secured to the capacitor and terminal areas 12 and 13 as by solder indicated at 15.

A pair of spaced conductive surfaces 16 and 17 extend outwardly from the capacitor and terminal areas 12 and 13 to the edge of disc 11, and are generally aligned with each other. These conductive areas provide a spark gap between their ends and across the edge 11c of the disc. If a surge of voltage is applied to the capacitor the air between the ends of conductive spark gap surfaces 16 and 17 ionizes and the energy in the surge is dissipated by a flow of current between the surfaces. The spark gap surfaces 16 and 17 should be kept free of solder as it has been found that the heat of the spark discharge may soften or melt the solder and it may flow shorting across the spark gap or from one of the terminals of the capacitor to some other element of the circuit.

A coating 18 of a suitable insulating material is applied to the exterior of the capacitor covering substantially the entire disc 11, the capacitor terminal areas 12 and 13 and the soldered ends of terminals 14. The insulating coating is so applied that it does not cover the conductive spark gap surfaces 16 and 17 as they must be open to the surrounding atmosphere in order to dissipate an excessive voltage properly.

In some situations, particularly antenna by-pass capacitors, a charge may build up slowly on the capacitor which could eventually damage the capacitor or cause an arc between the conductive spark gap surfaces of the capacitors of FIGURES 1–3. In FIGURES 4 and 5, a modified form of the invention is illustrated with provision for dissipating a slowly accumulating charge before it reaches the potential necessary for ionizing the air. A coating 20 of resistive material is applied to a portion of the disc 11, and connects the capacitor and terminal areas 12 and 13. Coating 20 provides essentially a resistance in parallel with the capacitor. The magnitude of the resistance depends to a large extent on the capacity of the capacitor and the nature of the application in which the capacitor is used. For example, with a capacitor designed for a television receiver antenna circuit and having a capacitance of 470 $\mu\mu f.$, the value of resistive coating 20 might be in the range of 0.3 to 3 megohms. It should be noted that the resistive coating 20 is so located on disc 11 that it does not cover conductive spark gap surfaces 16 and 17 as these should be left open to the atmosphere. An insulating coating 18 may be applied to the capacitor as in FIGURES 1–3.

FIGURE 6 illustrates schematically the circuit of the capacitor, with the spark gap surfaces 16 and 17 connected in parallel with the capacitor surfaces 12 and 13 and the resistor 20.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. A capacitor comprising: a generally round disc of ceramic dielectric material having spaced, aligned and generally parallel faces; generally circular conductive capacitor and terminal areas centrally located on each of said spaced faces said areas being smaller than said faces; generally rectangular aligned conductive areas, one on each face extending from said capacitor and terminal areas to edges of said faces providing a spark gap; a resistive coating on said disc connected with said terminal areas and spaced from said spark gap surfaces; and a coating of insulating material on said body, covering said terminal areas and said resistive coating, said spaced conductive spark gap surfaces being free of said insulating coating.

2. A capacitor comprising: a body of ceramic dielectric material having a pair of aligned, parallel and spaced apart faces and an edge surface; a capacitor terminal area of conductive material centrally located on one of said faces, said area being smaller than said face and having a peripheral edge spaced from the edge of the face; a complementary capacitor terminal area of conductive material centrally located on the other of said pair of faces aligned with the first-mentioned capacitor terminal area said complementary area being smaller than said other face and having a peripheral edge spaced from the edge of the other face; a pair of aligned conductive areas, one on each of said faces, extending radially outwardly from the associated capacitor terminal area and terminating at the peripheral edge of each face, the outer edges of said last-mentioned conductive areas forming the terminals of a spark gap across the edge surface of said body; and a coating of insulating material on said body, covering the capacitor terminal areas and the major portion of said body, said coating terminating short of the outer edges of said pair of conducting areas at the edge of said body, leaving said spark gap free and unobstructed.

3. The capacitor of claim 2 having terminal leads secured to said capacitor terminal areas and extending outwardly on either side of said pair of areas.

References Cited in the file of this patent

UNITED STATES PATENTS

| | | |
|---|---|---|
| 1,841,628 | Pickard | Jan. 19, 1932 |
| 2,566,666 | Khouri | Sept. 4, 1951 |
| 2,619,519 | Marks | Nov. 25, 1952 |
| 2,717,356 | Foster | Sept. 6, 1955 |
| 2,940,035 | Lefkowitz | June 7, 1960 |

FOREIGN PATENTS

| | | |
|---|---|---|
| 213,642 | Australia | Mar. 10, 1958 |
| 284,624 | Great Britain | Mar. 14, 1929 |
| 616,683 | Great Britain | Jan. 25, 1949 |